United States Patent [19]
Levinsohn et al.

[11] 3,759,552
[45] Sept. 18, 1973

[54] HYDRAULIC COUPLING WITH METALLIC SEALING MEMBER

[75] Inventors: Richard Levinsohn; James E. Jervis, both of Menlo Park, Calif.

[73] Assignee: Raychem Corporation, Menlo Park, Calif.

[22] Filed: Sept. 8, 1970

[21] Appl. No.: 70,321

[52] U.S. Cl. .......... 285/175, 285/331, 285/DIG. 18, 285/212
[51] Int. Cl. ............................................. F16l 33/24
[58] Field of Search ..................... 285/DIG. 18, 111, 285/112, 169, 175, 331, 220, 386, 381, 422, 212; 277/236

[56] References Cited
UNITED STATES PATENTS

| | | | |
|---|---|---|---|
| 2,303,311 | 11/1942 | Gredell | 285/331 |
| 2,641,381 | 6/1953 | Bertrand | 285/422 X |
| 3,279,806 | 10/1966 | Bialkowski | 285/111 X |
| 2,002,086 | 5/1935 | Dylewski | 285/111 X |
| 3,273,918 | 9/1966 | Legarra et al. | 285/112 X |

Primary Examiner—Andrew V. Kundrat
Attorney—Lyon & Lyon

[57] ABSTRACT

A hydraulic coupling is disclosed for connecting a hydraulic line to a hydraulic component such as a pump, compressor, cylinder or the like. The coupling consists of an adapter which fits into an opening in the hydraulic component. In order to form a leak-free joint between the adapter and the hydraulic component, a heat recoverable metallic sealing ring is placed between the surfaces. A heat recoverable sleeve is affixed to the hydraulic line and this sleeve mates with the adapter to form a seal. This seal results from the contact of a mating surface on the adapter and a corresponding mating surface on the sleeve. One of these mating surfaces projects inwardly toward the axis to permit a small amount of movement of this mating surface in the direction of the axis. A process is also disclosed whereby the metallic sealing ring is cooled below its transition temperature to convert it to a martensitic state only during installation.

13 Claims, 7 Drawing Figures

PATENTED SEP 18 1973

INVENTORS.
RICHARD LEVINSOHN
JAMES E. JERVIS
BY
Lyon & Lyon
ATTORNEYS

PATENTED SEP 18 1973 3,759,552

INVENTORS.
RICHARD LEVINSOHN
JAMES E. JERVIS
BY
Lyon & Lyon
ATTORNEYS

HYDRAULIC COUPLING WITH METALLIC SEALING MEMBER

BACKGROUND OF THE INVENTION

This invention relates to couplings which permit the connection of a hydraulic line to a hydraulic component to form a leak-free seal. The hydraulic component may be a pump, compressor, hydraulic cylinder, or the like. More particularly, this hydraulic coupling is of the type which need not utilize any rubber or plastic parts, thereby permitting operation over a wide temperature range.

Many hydraulic components are provided with a standard threaded female boss. Most connectors utilize some adapter which screws into the threaded boss. It is necessary that a fluid-tight connection be made between the hydraulic component and this adapter. A common prior art sealing method utilizes a rubber O-ring. It then becomes necessary to seal this adapter, which is often a threaded nipple, to the hydraulic line.

A common method for connecting a hydraulic line to a nipple extending from a hydraulic component is to utilize flared tubing which is tightened onto the threaded nipple by a nut which fits over the tubing. This nut holds the flared end against the threaded nipple. Another common method is to place an elastic ring around the outside diameter of the tubing near its end. This elastic ring is then caused to press against the outside of the tubing and the nipple by an overlying nut which screws into the threaded nipple extending from the hydraulic component.

A metal to metal seal is disclosed in U.S. Pat. No. 3,083,989 issued to I.D. Press. In this coupling, a metal flange is tightened against a mating surface. This system requires an elaborate arrangement to secure the flange-containing member to the hydraulic tubing.

More recently, heat recoverable metals have been utilized to form a metal to metal coupling. One such coupling is disclosed in U.S. application, Ser. No. 51,809 filed July 2, 1970, which was a continuation-in-part of Ser. No. 852,722. This application was filed by J.D. Harrison and J.E. Jervis and assigned to the assignee of the present invention, and the disclosure of this application is incorporated by reference herein. Heat recoverable alloys are disclosed in U.S. application, Ser. No. 52,112, filed July 2, 1970. This application was filed by J.D. Harrison, J.Y. Choi and P.R. Marchant and assigned to the assignee of the present invention, and the disclosure of this application is incorporated by reference herein.

SUMMARY OF THE INVENTION

The coupling of this invention uses a new system for sealing an adapter to a hydraulic component and also uses a new system for sealing the adapter to a hydraulic line. It has long been recognized that a metal seal for hydraulic parts would have many advantages over a rubber or plastic seal. A metal seal is far less affected by temperature and cannot be softened or swollen by hydraulic fluids. Unfortunately, seals made from many metals tend to scratch or cause galling of the sealing surfaces of the hydraulic component. To attempt to correct this problem, seals have been made of soft metals but then they lack the physical properties of the harder metals which are necessary to withstand high pressure.

According to the present invention the seal between the hydraulic component and the adapter comprises a metal seal of great strength but yet one which will not scratch or gall the sealing surface of the hydraulic component during installation. This beneficial combination of properties is permitted by the use of a metal which can exhibit vastly different physical properties at different temperatures. As disclosed in the aforementioned application Ser. No. 52,112 filed by Harrison, Choi and Marchant filed July 2, 1970, and in Chapter 22 of Intermetallic Compounds edited by J.H. Westbrook, Wiley & Sons 1967, certain alloys can be made to convert from a relatively strong austenitic state to a relatively weak martensitic state by reducing the temperature of the alloy to below its transition temperature.

Alloys containing major proportions of titanium and nickel exhibit the ability to be transformed reversibly from an austenitic state to a martensitic state by a temperature change. Small amounts of metals such as iron, aluminum or manganese may be incorporated with major amounts of titanium and nickel to result in an alloy with the desired transition temperature. By way of example, the following alloys (in atomic percents) have transition temperatures above $-196°$ C and below $-75°$ C.

| | | |
|---|---|---|
| Titanium 50 | Nickel 47 | Iron 3 |
| Titanium 49 | Nickel 50 | Aluminum 1 |
| Titanium 50 | Nickel 48 | Manganese 2 |

The alloy preferably should have a transition temperature above $-196°$ C since then it can be converted to a martensitic state by immersing it in readily available liquid nitrogen.

The phase change from martensitic to austenitic can also be made to result in heat recoverability by the addition of stresses to the alloy, particularly when it is in its martensitic state. This is described in the aforementioned application Ser. No. 51,809 to Harrison and Jervis filed July 2, 1970. Other heat recoverable metals are disclosed in U.S. Pat. Nos. 3,012,882 and 3,174,851 and Belgian Pat. No. 703,649 the disclosure of which are incorporated by reference herein.

Thus, to form a strong, galling resistant seal, the adapter and metal seal are cooled to below the transition temperature of the seal and the adapter is affixed to the hydraulic component. The seal is then allowed to warm above its transition temperature at which time it converts from its weak martensitic state to its strong austenitic state. The alloy from which the seal is made should have a transition temperature below the operating temperature of the hydraulic equipment in order to keep the seal in its austenitic state during operation. This heat recoverability may also be utilized to cause a change in shape of the seal as it is warmed above its transition temperature. Thus the seal, in its martensitic state, may be deformed so as to fit over an enlarged area on the adapter and when warmed to its austenitic state will revert to its original configuration become captive. Additionally, the seal may become captive by engagement along its outer surface.

The second sealing point of the present invention exists between the adapter and the hydraulic line. This second seal also utilizes a heat recoverable metal but for a different reason. A heat recoverable sleeve is first affixed to the hydraulic line. This may be done by several methods including shrinking the sleeve over the hydraulic line in a manner described in the aforementioned application Ser. No. 51,809 This sleeve is provided with a circular mating surface corresponding to a mating surface on the adapter. Either one or both of these mating surfaces is undercut to permit some movement of this mating surface along the direction of the axis of the coupling. Means are provided to tighten and hold the sleeve against the adapter.

The resulting coupling is a removable all-metal coupling useful over a wide temperature range and unaffected by solvatiog properties of the hydraulic fluid. Also, the hydraulic component is not scratched by the installation of the adapter and yet a seal of great strength results.

DESCRIPTION OF THE PREFERRED EMBODIMENTS

Figure 1:
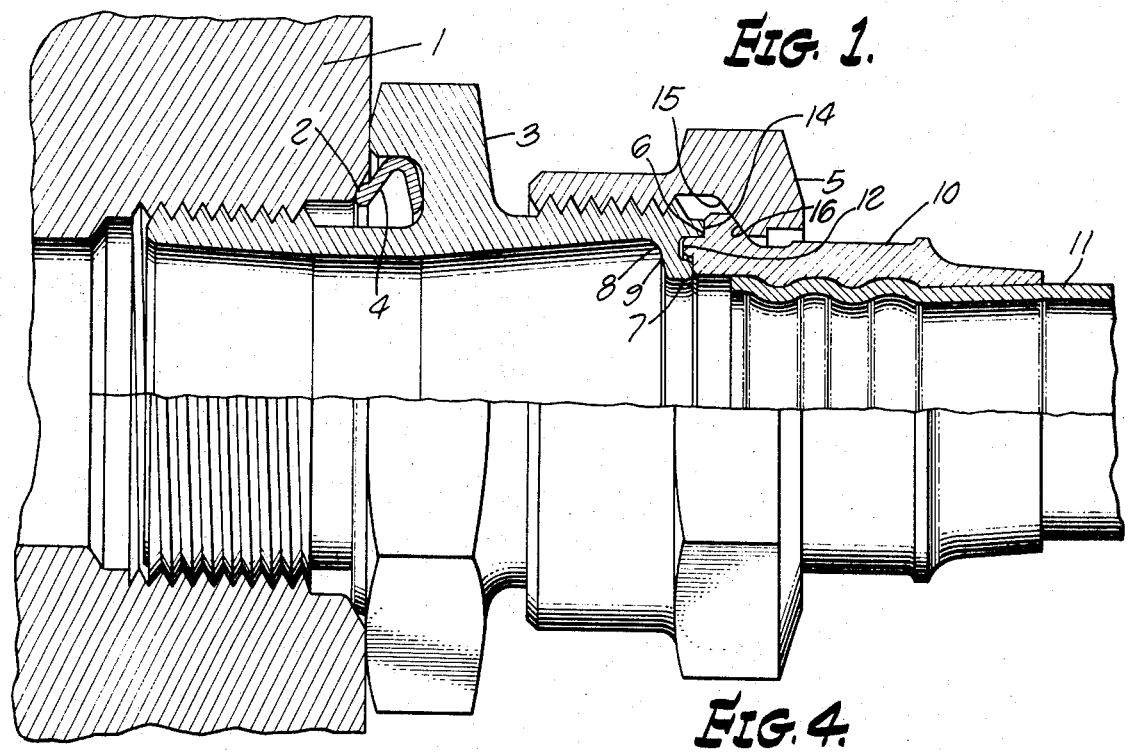
FIG. 1 is a plan view partly in section of a preferred coupling according to the present invention.

Turning now to FIG. 1, a threaded hole or boss is provided in hydraulic component 1 which is provided with a mating surface 2 at the outer edge of the hole. An adapter 3 is shown screwed into the boss in hydraulic component 1. A heat recoverable V-ring seal 4 is shown in a recess of adapter 3 and mates both with the adapter and mating surface 2 thereby preventing fluid leakage between the hydraulic component and the adapter. The adapter is threaded at one end to fit the threaded hole in the hydraulic component. The outside diameter of the adapter is also threaded at its other end to permit the attachment of coupling nut 5 thereon. The adapter 3 has an intermediate hexagonal wrench flat which facilitates tightening of the adapter into the threaded hole. The recess is located beneath this wrench flat. Adapter 3 has an outer circular projecting ring 6 which serves to protect circular mating surface 7. Recessed area 8 has been formed behind circular mating surface 7 to permit some movement of the mating surface as described below. This movement provides an initial sealing pressure.

Figure 4:
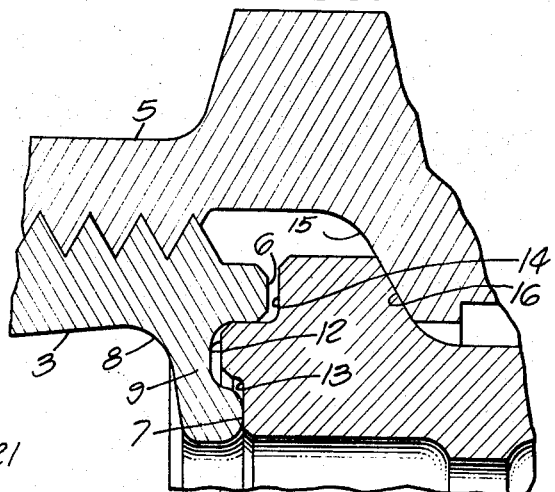
FIG. 4 is an enlarged fragmentary view of the heat recoverable sleeve end portion of FIG. 1 shown prior to final engagement.
Figure 5:
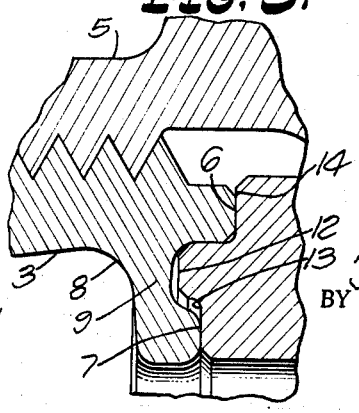
FIG. 5 is an enlarged fragmentary view of the heat recoverable sleeve end portion of FIG. 1 shown after final engagement.

Heat recoverable sleeve 10 has been securely shrunk about hydraulic line 11 by the manner described in application, Ser. No. 51,809 to Harrison and Jervis described above. Heat recoverable sleeve 10 has a projecting ring 12 which provides scuff protection for the circular mating surface 13 on the heat recoverable sleeve and also helps to align the adapter with the sleeve prior to tightening. The sleeve 10 also has a recessed portion 14 which provides a stop for outer circular projecting ring 6 of the adapter. The shoulder 15 of coupling nut 5 pushes against the shoulder 16 of the heat recoverable sleeve 10 to cause the sleeve to be brought against the adapter 3 when the coupling nut is screwed on the adapter. The operation of the seal between mating surfaces 7 and 13 is more clearly shown in FIGS. 4 and 5 where adapter 3 and sleeve 10 are shown prior to tightening in FIG. 4 and after tightening in FIG. 5. The circular mating surface 7 of the adapter contacts mating surface 13 of the sleeve before outer circular projecting ring 6 of the adapter has touched the recessed portion 14 of the sleeve 10. As the sleeve 10 is forced toward adapter 3 by coupling nut 5, the mating surface 7 of the adapter moves toward the hydraulic component in a direction generally parallel to the axis of the coupling. This results from the provision of recessed area 8 which forms an inwardly extending arm 9 between the circular mating surface 7 and the main body of the adapter. The result is an action like a belleville spring which maintains a steady force between mating surfaces 7 and 13 thereby forming an excellent seal. The pressure of the hydraulic fluid on the recessed area 8 supplements this force and forms a dynamic seal between these mating surfaces.

Figure 2:
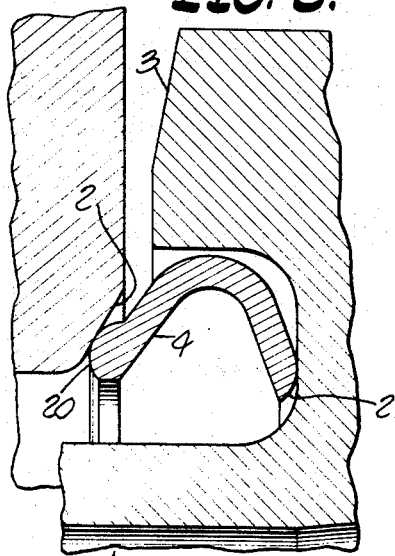
FIG. 2 is an enlarged fragmentary view of the heat recoverable seal end portion of FIG. 1 shown prior to final engagement.
Figure 3:
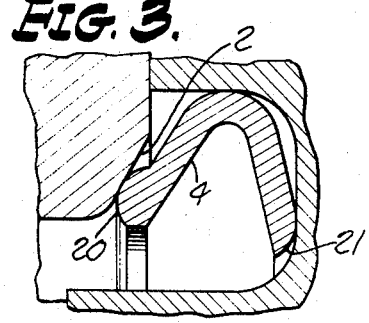
FIG. 3 is an enlarged fragmentary view of the heat recoverable seal end portion of FIG. 1 shown after final engagement.

Turning now to FIGS. 2 and 3, heat recoverable V-ring seal 4 is shown in enlarged cross section in a recessed portion of adapter 3. In FIG. 2, the seal is shown prior to tightening and in FIG. 3 after tightening. A bead 20 having a generally semi-circular outer surface is provided at the end of one side of the V-ring which contacts mating surface 2 of the hydraulic component. An arcuate surface 21 is provided at the end of the outer side of heat recoverable seal 4 which contacts adapter 3. The shape of seal 4 is such that hydraulic pressure within the coupling tends to expand the seal against the hydraulic component and the adapter at points 20 and 21. If desired a bead or arcuate surface may be provided on each of the sides of the sealing ring thus preventing any accidental reverse positioning of the ring.

Figure 6:
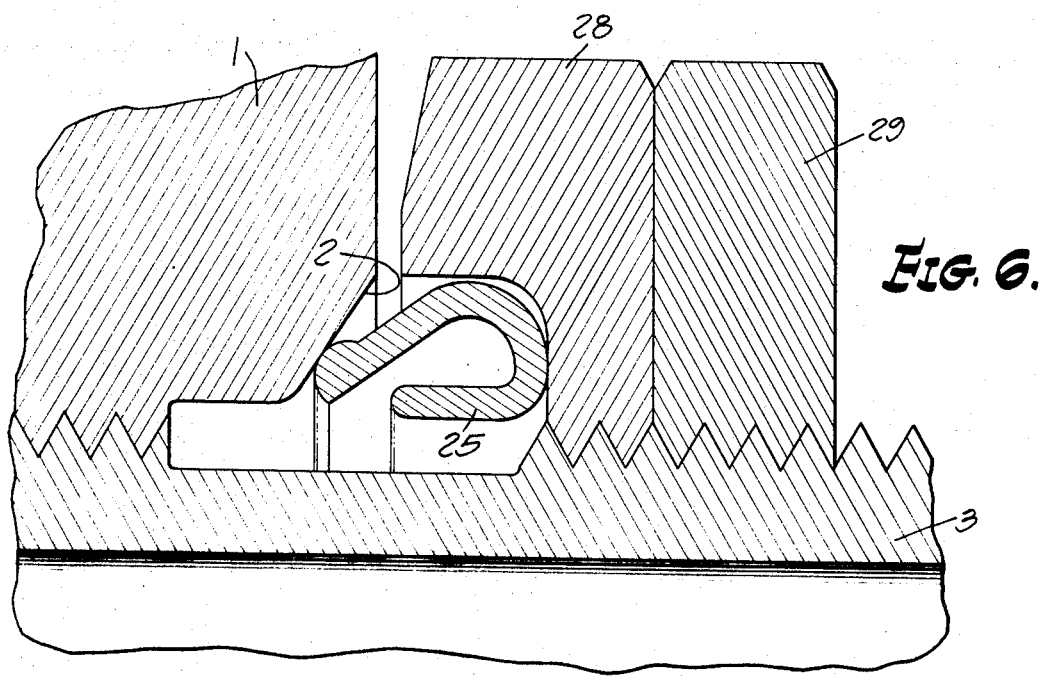
FIG. 6 is an enlarged cross sectional view of an alternatively configured heat recoverable seal end portion prior to heat recovery.
Figure 7:
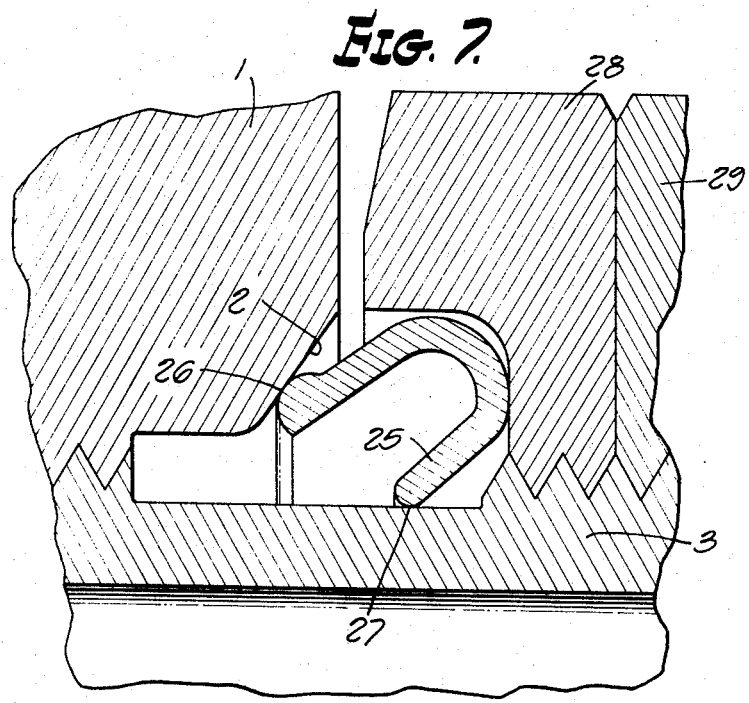
FIG. 7 is an enlarged cross sectional view of the heat recoverable seal end portion of FIG. 6 after heat recovery.

Turning now to FIGS. 6 and 7, there is shown an alternative configuration of the heat recoverable seal.

In FIG. 7, heat recoverable seal 25 is shown in its sealing position having mating areas at 26 and 27. The hydraulic pressure tends to increase the seal at these areas. Since, in this configuration, the seal has a mating area 27 on an outer surface of the adapter 3 it is less dependent upon the position of the tightening surface which is shown In FIGS. 6 and 7 as tightening nut 28. Thus a fluid tight seal results even though the tightening surface is not threaded fully against the hydraulic component.

The seal 25 is shown in FIG. 6 in its martensitic state having been deformed which enables it to be placed over the threads of the adapter 3. When the seal is warmed above its transition temperature, it reverts to its stronger austenitic state and to its original undeformed configuration as shown in FIG. 7. This has the further advantage of capturing the seal. In order to hold tightening nut 28 in place, a lock nut 29 is also threaded over adapter 3.

The heat recoverable alloy chosen for the seal should have a transition temperature such that it exists in its strong austenitic state at the operating temperatures of the hydraulic system in which it is used. This heat recoverable seal should also be capable of being cooled to below its transition temperature for installation of the adapter into the hydraulic component. In this way, damage to the mating surface of the boss can be minimized. As described in aforementioned application to Harrison and Jervis, Ser. No. 51,809 this may be a very low temperature in that the adapter may be cooled in a fluid such as liquid nitrogen just prior to connection with the hydraulic component. It is not necessary that the V-ring seal be lowered in temperature below its transition temperature if galling is not a problem.

The sleeve is normally connected to the adapter after the adapter has been connected to the hydraulic component. The means for holding the sleeve against the adapter need not utilize a coupling hut but instead could use a circumferential clamp, a threaded union, or the like. The projecting ring on the adapter and that on the sleeve are not essential to the operation of the coupling but are advantageous to prevent the mating surfaces from becoming marred or scuffed. While the recessed area and inwardly extending arm are shown in the drawings as a portion of the adapter, it could equally well be provided in that heat recoverable sleeve. It is only necessary that a belleville spring type of action exist between the mating surface of the adapter and that of the sleeve.

It is not necessary that the heat recoverable sleeve be fabricated from the same alloy as the heat recoverable seal. Its transition temperature, however, should be such that it also exists in its stronger austenitic state at the temperatures at which it will operate.

The particular curvature of the heat recoverable seal shown in the drawing may be varied to a more U shape or a more V shaped configuration as long as the fluid pressure will tend to expand the seal against its two mating surfaces. The hydraulic component need not be a piece of equipment having a threaded hole but could be a second section of hydraulic tubing thus constituting a union between hydraulic lines. While certain embodiments of the invention are described, the invention may be embodied in other specific forms not departing from the spirit or central characteristic thereof. The present embodiments are therefore to be considered in all respects as illustrative and not restrictive.

What is claimed is:

1. A coupling for connecting a hydraulic tubing to a hydraulic component comprising:
   an adapter capable of being attached to said hydraulic component at its first end and having a sealing surface on its other end;
   a seal adapter to fit between said component and said adapter, said seal being made from a metal capable of being converted to a martensitic state at a temperature below the operating temperature of said coupling and existing in its austenitic state when at the operating temperature of said coupling;
   means for attaching said adapter to said component;
   a sleeve attached to said hydraulic tubing, said sleeve having a sealing surface adapted to mate with the sealing surface of said adapter; and
   means for holding said sleeve against said adapter to create a seal between said sealing surfaces.

2. The coupling of claim 1, wherein said means for attaching the adapter to the coupling comprises a threaded hole in said component and a corresponding threaded nipple in said adapter.

3. The coupling in claim 1, wherein said means for holding said sleeve against said adapter comprises an enlarged end portion on said sleeve, a coupling nut capable of fitting over the body of said sleeve, said nut having a threaded portion extending beyond said enlarged end portion and a corresponding threaded portion on said adapter.

4. The coupling of claim 1, wherein said seal is fabricated from an alloy containing major proportions of titanium and nickel.

5. The coupling of claim 4 wherein said alloy further contains a minor proportion of a metal selected from a group consisting of iron, aluminum, and manganese.

6. The coupling of claim 1 wherein said sleeve is heat recoverable and is fabricated from an alloy containing major proportions of titanium and nickel.

7. The coupling of claim 6 wherein said alloy contains a minor proportion of a metal selected from a group consisting of iron, aluminum and manganese.

8. The coupling of claim 1 wherein said seal is a V-ring and has at least one semi-circular sealing surface.

9. The coupling of claim 8 wherein said V-ring is symmetrical.

10. The coupling of claim 1 wherein said sealing surface of the adapter is borne by an arm extending radially inwardly from the periphery of an inner surface of said adapter adjacent one end thereof toward the longitudinal axis of said adapter and is hence capable of axial deflection with said arm upon connection of the adapter to said sleeve.

11. The coupling of claim 10 wherein the sealing surface of said adapter is provided with an outer circular projecting ring and wherein said heat recoverable sleeve is provided with a corresponding recessed portion to permit the contact of the sealing surface of said adapter with the sealing surface of said sleeve.

12. The coupling of claim 1 wherein said sleeve is provided with a circular projecting ring located between the sealing surface and a recessed portion of the sleeve and wherein said adapter is provided with a corresponding recessed portion adapted to receive said ring.

13. In an adapter suitable for connection of a hydraulic component to a hydraulic line, said adapter having an elongate body hollowed about a longitudinal axis thereof for the passage of fluid therealong, the improvement which comprises:
   an arm extending radially inwardly from the periphery of an inner surface of said body adjacent one end thereof toward said longitudinal axis, an axial projection on said arm extending toward said end and terminating in a circular radial sealing surface of diameter less than the diameter of said periphery, said projection being capable of axial deflection with said arm upon connection of the adapter to said line; and
   a ring integrally formed on said end of the adapter concentric about but of diameter greater than said circular radial sealing surface, and projecting axially outwardly beyond said sealing surface to define an annular space bounded by said ring, arm and projection and adapted to receive a sealing surface carried by said line.

* * * * *